United States Patent [19]

Downs

[11] Patent Number: 5,186,256
[45] Date of Patent: Feb. 16, 1993

[54] THREE DIRECTIONAL DRILLING PROCESS FOR ENVIRONMENTAL REMEDIATION OF CONTAMINATED SUBSURFACE FORMATIONS

[75] Inventor: Charles E. Downs, Ponca City, Okla.
[73] Assignee: Conoco Inc., Ponca City, Okla.
[21] Appl. No.: 718,723
[22] Filed: Jun. 20, 1991
[51] Int. Cl.$^5$ .................. E21B 43/00; E21B 43/24
[52] U.S. Cl. .................. 166/272; 166/50; 166/268
[58] Field of Search .............. 166/50, 52, 268, 272, 166/266; 175/61, 62

[56] References Cited

U.S. PATENT DOCUMENTS

| | | | |
|---|---|---|---|
| 4,401,170 | 8/1983 | Cherrington | 175/61 X |
| 4,445,574 | 5/1984 | Vann | 166/50 X |
| 4,466,485 | 8/1984 | Shu | 166/50 X |
| 4,593,760 | 6/1986 | Visser et al. | 166/267 |
| 4,660,639 | 4/1987 | Visser et al. | 166/267 |
| 4,682,652 | 7/1987 | Huang et al. | 166/50 X |
| 4,832,122 | 5/1989 | Corey et al. | 166/50 X |
| 4,995,456 | 2/1991 | Cornette et al. | 166/50 X |
| 5,033,546 | 7/1991 | Combe | 166/50 X |
| 5,065,821 | 11/1991 | Huang et al. | 166/50 X |

OTHER PUBLICATIONS

Jet Trac TM Advertisement from The Charles Machine Works, Inc. dated Apr. 1991.
Ditch Witch Advertisement from The Charles Machine Works, Inc. dated Mar. 1990.

*Primary Examiner*—Stephen J. Novosad

[57] ABSTRACT

The present invention resides in a three directional horizontal drilling process which is suitable for the in-situ treatment or extraction of undesirable contaminants from subsurface formations. A first extraction well is drilled utilizing three directional horizontal drilling techniques in the general vicinity of a contaminated subsurface formation. A second injection well is strategically drilled to direct contaminants into a subsurface screen system in the extraction well, thus facilitating the extraction and collection of undesirable contaminants.

17 Claims, No Drawings

THREE DIRECTIONAL DRILLING PROCESS FOR ENVIRONMENTAL REMEDIATION OF CONTAMINATED SUBSURFACE FORMATIONS

BACKGROUND OF THE INVENTION

1. Field of the Invention

The present invention resides in a three directional horizontal drilling process which is suitable for the installation of horizontal wells for in-situ treatment or extraction of undesirable contaminants, for example, fluids and gases, from subsurface formations. Preferably a first extraction well is used in conjunction with a second injection well to expedite the extraction of undesirable contaminants.

Contaminated subsurface formations located under structures such as buildings, storage tanks, roadways, shallow waterways, land farms, and the like, present an especially difficult dilemma which often times are inaccessible by conventional methods in addition to being an expensive problem to correct. The present invention eliminates or solves this problem by utilizing drilling machinery equipped with a steerable drill which can be precisely directed into the vicinity of contaminated formations.

The most common environmental problem encountered in subsurface formations is contaminated ground water. One method of removing contaminants from subsurface formations is by excavating the contaminated subsurface material. This method of eliminating contaminants from subsurface formations is very expensive and time consuming.

Other methods have been proposed for eliminating contaminants from subsurface formations using various vertical well systems for the purpose of extracting said contaminants. Vertical wells, however, suffer from the disadvantage of not being able to exploit fully, because of accessibility on limited subsurface exposure, extraction of contaminants from a subsurface formation because of the vertical configuration of said well systems.

2. Description of the Prior Art

Processes for the extraction of subsurface formations are known and are currently practiced commercially.

For example, U.S. Pat. No. 4,832,122 discloses a system for removing volatile contaminants from a subsurface plume of contamination which utilizes two sets of wells. One well is for injecting a fluid into a saturated zone on one side of the plume and the other well is for extracting and collecting the fluid and volatile contaminants from the other side of the plume.

U.S. Pat. Nos. 4,593,760 and 4,660,639 relate to a method for removing volatile contaminants from the upper, unsaturated zone of groundwater. Vertical wells are sunk into the contaminated zone having casings consisting of two sections. The casings consist of an upper unperforated section and a lower perforated section. Volatile contaminants are extracted through the perforated section of the casing and pumped past the unperforated section of casing to the surface for treatment.

It should be noted that, the prior art of record fail to teach or disclose a three directional horizontal drilling process which is precisely directed into a contaminated subsurface formation to extract contaminants therefrom.

SUMMARY OF THE INVENTION

The present invention resides in a three directional horizontal drilling process for the in-situ decontamination of a subsurface formation which comprises (a) constructing a first horizontal extraction well system in the vicinity of a contaminated subsurface formation, said horizontal extraction well system having an entrance into and a separate exit out of a subsurface formation, (b) constructing a second horizontal injection well system separate and apart from the horizontal extraction well system, said injection well system being in the vicinity of said contaminated subsurface formation, (c) injecting a fluid or a gas into said injection well system, to mobilize contaminants in the subsurface formation toward said horizontal well system, and (d) extracting contaminated fluid or gas from said subsurface formation with said extraction well system.

More particularly, the process herein resides in a three directional horizontal drilling process which comprises:

(a) drilling a bore hole on a downward slant into a subsurface formation until a desired depth is reached, (b) steering a drill head to continue drilling the bore hole on a horizontal plane, (c) elevating the drilling to exit the bore hole at the surface of the formation, (d) attaching a well screen to an expanded, reverse drill head; and (e) re-drilling the bore hole back toward the initial entry into the subsurface formation, pulling the well screen into and through the bore hole.

DETAILED DESCRIPTION OF THE INVENTION

A three directional horizontal drilling process is provided for the in-situ decontamination of a subsurface formation which utilizes a horizontal well extraction system either alone or in conjunction with a second injection well system.

The invention in a preferred embodiment involves drilling a horizontal extraction, well system in the vicinity of a contaminated subsurface formation. A steerable drill bit equipped with an electronic, built-in transmitter is directed to drill a bore hole on a downward slant into the ground toward a contaminated subsurface formation. Generally, the downward slant comprises an angle of from about 10 degrees to about 75 degress from the surface. The bore hole is drilled at an angle (slant) because it is easier to direct or steer the drill, e.g. turn the drill, by drilling at an angle. Normally, the bore hole has a diameter of from about 1½ inches to about 10 inches, however, in some applications the bore hole can have a diameter of up to 12 inches.

Preferably, the bore hole for the horizontal extraction well system is drilled in the vicinity of a contaminated subsurface formation. The vicinity of a contaminated subsurface formation is described herein as the bore hole passing through a contaminated subsurface formation, the bore hole passing under a contaminated subsurface formation, the bore hole passing along the perimeter of either side of a contaminated subsurface formation or the bore hole completely surrounding a contaminated subsurface formation.

The bore hole is generally drilled to a depth of from about 10 feet to about 500 feet, preferably from about 10 feet to about 200 feet, most preferably from about 10 feet to about 50 feet, however, depths of up to 1000 feet may be drilled in certain situations. After the bore hole is drilled to the desired depth, the drill bit is steered in a horizontal position either to the right or left, up or down etc. in order to position the bore hole in the desired horizontal plane in relation to the contaminated subsurface formation for the effective and efficient extraction or inplace treatment of contaminants from said subsurface formation.

An example of a drilling machine suitable for drilling the bore holes herein is a boring system marketed commercially by the Ditch Witch Cooperation under the trade name of Jet Trac ™.

The drill bit utilized in the drilling operation may be any of the conventional drills normally used in a subsurface drilling procedure which is or can be equipped with an electronic, built in transmitter to enable an operator to steer the drill in a desired direction.

After the bore hole is drilled in the proper orientation to the zone of contamination, e.g. contaminated subsurface formation, the drill bit is directed to drill at an elevated angle to exit the surface of the ground at a location that is separate from the initial point of entry for the bore hole. Generally, the angle of elevation for the bore hole is from about 10 degrees to about 75 degrees from a plane that is horizontal to the contaminated subsurface formation.

Next, the original drill bit is replaced with a reverse drill bit, e.g. reaming bit and well screen is attached to the end of the reaming bit.

Reverse drills or reaming bits that are suitable for use herein include expansion swedges, tri-cone rotary bits, and single or double fixed blade bits. The expansion swedge forces the diameter of the bore hole increase by the process of pulling this bit backward through the bore hole toward a drilling machine. The tri-cone rotary bit cuts a wider diameter bore through the bore hole as it is pulled backward through the bore hole. The single or double fixed blade is a solid triangular shaped metal wedge containing blades which cut or loosen the soil around the bore hole thereby making it possible to compact the soil around the bore hole more tightly, thus making the bore hole diameter larger.

In addition to the above-described reverse drill bits, variable size bells or balls and/or a larger drill stem may be attached to the drill string and pulled through the bore hole, causing the walls of the bore hole to compress outward thereby increasing the bore hole diameter. The reverse drilling or hole expansion process is necessary to expand the initial bore hole diameter to a diameter sufficiently large to accommodate the well screen.

The well screen is a pipe or circular shaft which has a diameter of 1 inch to 8 inches, but can extend to 12 inches for certain systems. The well screens can be continuous, but preferably have an incremental-section length of from about 10 feet to about 20 feet, equipped with coupling means at both ends of said screen. The well screens are perforated to allow for extraction of contaminants from the subsurface formation. The perforations in the well screen can consist of small round holes, slots or openings of other configurations. The only criteria for the perforations is that they be large enough and in sufficient quantity to allow the effective extraction of contaminants from the subsurface formation without sacrificing the structural integrity of the well screen.

Suitable well screens are preferably constructed from polyvinyl chloride, high density polyethylene and stainless steel. The composition of the well screen utilized will depend to a large extent upon the characteristics of the subsurface formation and the contaminants that are to be extracted.

The well screen is attached to the reverse drill bit (reamer head) utilizing one of several means, namely, a threaded coupler containing a universal joint, a welded coupler containing a universal joint or "U" bolts attached to the reamer head and to the end of the well screen.

After the well screen is attached to the reverse drill bit, the drill bit is pulled back through the initial bore hole, increasing the diameter of the bore hole to a diameter sufficiently large to accommodate the well screen as it is pulled back through the bore hole toward the drilling machine. When the well screen reaches the drilling machine, the entire length of the bore hole will have been screened and the extraction well is complete. After completion of the screened well, the complete system is flushed with either a fluid or a gas preferably under pressure to clean the system. Other conventional tools and equipment, such as pumps holding tanks and the like may be attached to and made a part of the extraction well system in order to facilitate the extraction of contaminants from the subsurface formation.

The extraction well system may be utilized as a single unit. However, under certain conditions and with certain geological formations, it may be desirable to use a second injection well or series of injection wells in conjunction with the extraction well system. The injection well can be either a horizontal well system as previously described for the extraction well system with a single entry point or an additional exit point, or in the alternative the injection well can be a single vertical well or a series of vertical wells.

The orientation of the injection well system and the extraction well system with respect to each other is determined by the subsurface geology and the flow rate of the fluid or gas used in the injection well. The important consideration in orientating the injection well system in relation to the extraction well system is that the injection well system provide a sufficient dispersing source of fluid or gas so as to influence a substantial portion of the contaminated subsurface formation resulting in enhanced extraction of said contaminants by said extraction well system.

DESCRIPTION OF THE PREFERRED EMBODIMENTS

The following examples serve to further illustrate to one skilled in the art the best mode of how to practice this invention and are not intended to be construed as limiting thereof.

EXAMPLE 1

A Jet Trac ™ drilling machine marketed by the Ditch Witch Corporation was used to drill a three directional horizontal well system under a public park to extract contaminated ground water. The drilling machine was equipped with a 3 inch directional drill bit, containing an internal, electronic transmitter. The drill bit was attached to a 2 inch drill stem.

Drilling was initiated with an initial entry angle into the ground surface of approximately 60 degrees from vertical (30 degrees from horizontal). The boring was advanced to a depth of 25 feet. Next, the driller under the direction of a controller directed the drill bit to bore a horizontal bore hole of approximately 250 feet. Upon completion of drilling the horizontal bore hole, the driller with the guidance of the controller directed the drill bit to angle toward the surface at an angle of approximately 60 degrees from vertical. The drilling was continued until it exited at the ground surface.

After the drill bit surfaced at the desired location, the drill bit was replaced with a bell shaped bit containing 2 cuttings blades. The drill was an expansion or reaming bit (reverse drilling bit) with a boring diameter of 4 inches, and additionally equipped with a welded coupler containing a universal joint.

A 2-inch flush jointed well screen constructed from polyvinyl chloride was attached to the reaming bit with a threaded coupler. The threaded coupler screwed into one end of the well screen. The well screen was constructed from individual sections of polyvinyl chloride pipe having lengths of 20 feet, slot widths of 0.023 inch and equipped with threads on each end for connection purposes.

The initial bore hole was reverse drilled, pulling the well screen behind the drill bit until the well screen extended the entire length of the bore hole.

Analysis of the ground water extracted from the well indicated that contaminants (dissolved hydrocarbons) were being extracted from the subsurface formation.

EXAMPLE II

The procedure of Example I is followed to drill an injection well system in the general area of the extraction well system with the following exceptions:

injection pumps are attached to the well system and water is injected into the subsurface formation. The extraction of contaminants from the subsurface formation is enhanced by utilizing the injection well system in conjunction with the extraction well system.

As can readily be determined from the above examples, the extraction well system and process herein effectively extracts contaminants from subsurface formations. Obviously, many modifications and variations of the invention, as hereinbefore set forth, may be made without departing from the spirit and scope thereof, and therefore only such limitations should be imposed as are indicated in the appended claims.

I claim:

1. A process for in-situ decontamination of a subsurface formation which comprises:
   (a) constructing a horizontal extraction well system having initial and secondary entry points into the subsurface formation in the vicinity of a contaminated subsurface formation by
      (1) drilling a bore hole on a downward slant into a subsurface formation until the desired depth is reached,
      (2) steering a drill head to continue drilling the bore hole on a horizontal plane,
      (3) elevating the drilling to exit the bore hole at a second entry point on the surface of the formation,
      (4) attaching a well screen to an expanded, reverse drill head and
      (5) re-drilling the hole back toward the initial entry point into the subsurface formation, pulling the well screen into and through the bore hole,
   (b) constructing a injection well system separate and apart from the horizontal extraction well system of step (a),
   (c) injecting a fluid or a gas into said injection well system, to mobilize contaminates toward said horizontal extraction well system; and
   (d) extracting contaminated fluid or gas from said extraction well through said initial and second entry points.

2. The process according to claim 1 wherein the downward slant of step (1) comprises an angle of from about 20 degrees to about 75 degrees.

3. The process according to claim 1 wherein the drill head of step (2) is steered to the left.

4. The process according to claim 1 wherein the drill head of step (2) is steered to the right.

5. The process according to claim 1 wherein the bore hole of step (1) is drilled to a depth of from about 10 feet to about 500 feet.

6. The process according to claim 1 wherein the drilling is elevated in step (3) to an upward angle of from about 10 degrees to about 75 degrees.

7. The process according to claim 1 wherein the well screen is a round pipe having a diameter of from about 1 inch to about 12 inches.

8. The process according to claim 7 wherein the well screen is permeable to fluids and gases and said well screen is constructed from a material selected from the group consisting of polyvinyl chloride, high density polyethylene and stainless steel.

9. The process according to claim 8 wherein a fluid or gas is extracted through the well screen.

10. The process according to claim 1, wherein said injection well of step (b) is constructed according to parts (1-5) of step (a).

11. A process for in-situ decontamination of a subsurface formation which comprises:
   (a) constructing a horizontal extraction well system in the vicinity of a contaminated subsurface formation, said horizontal extraction well system having initial and second entry points from a surface location into a subsurface formation,
   (b) constructing an horizontal injection well system separate and apart from the horizontal extraction well system of step (a),
   (c) injecting a fluid or a gas into said injection well system, to mobilize contaminates toward said horizontal extraction well system; and
   (d) extracting contaminated fluid or gas from said extraction well through said initial and second entry points subsurface formation.

12. The process according to claim 11 wherein the horizontal extraction well system contains a horizontal bore hole containing a permeable well screen which is positioned beneath the contaminated subsurface formation.

13. The process according to claim 12 wherein the permeable screen comprises at least one horizontal shaft comprising an elongated round casing having a multiplicy of apertures through which fluid or a gas passes.

14. The process according to claim 11 wherein the horizontal extraction well system contains a horizontal bore hole containing a permeable well screen which is positioned around the perimeter of the contaminated subsurface formation.

15. The process according to claim 11 wherein the horizontal extraction well system contains a horizontal bore hole containing a permeable well screen which extends along a plane that is parallel to the contaminated subsurface formation.

16. The process according to claim 11 wherein the fluid or gas injected into said injection well system is selected from the group consisting of water, water vapor, air, oxygen, air and oxygen and carbon dioxide.

17. The process according to claim 16 wherein the fluid or gas is heated prior to injection in said injection well system.

* * * * *